M. R. HULL.
TOP EXTENSION FOR OPEN VEHICLE BODIES.
APPLICATION FILED APR. 6, 1915.
1,174,155.
Patented Mar. 7, 1916.
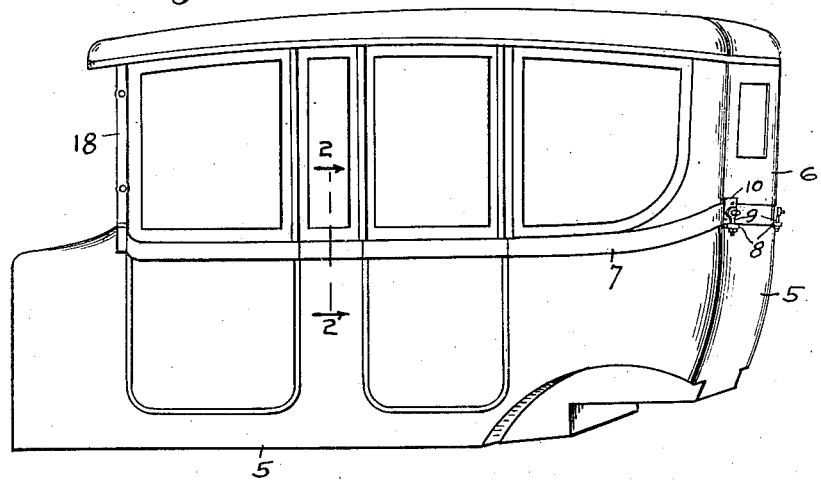
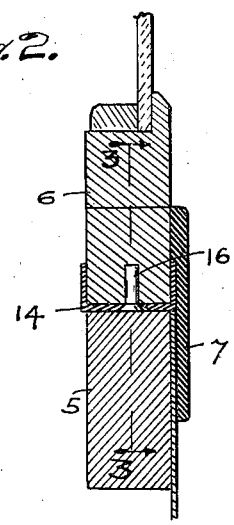
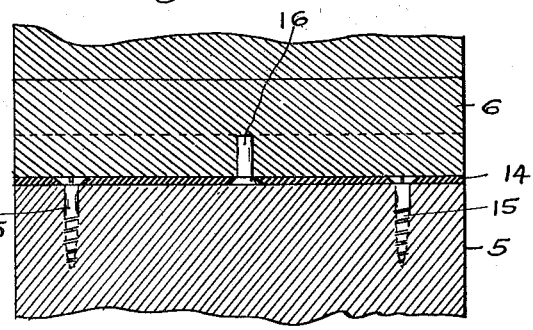
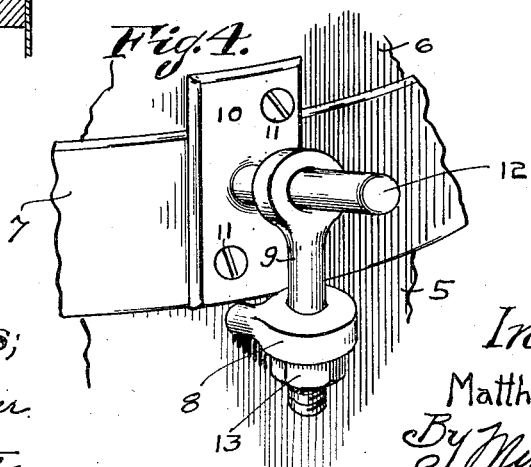
Witnesses;
L. B. Woerner
Wm Hurte
Inventor,
Matthew R. Hull,
By Minturn & Woerner
Attorneys.

UNITED STATES PATENT OFFICE.

MATTHEW R. HULL, OF CONNERSVILLE, INDIANA, ASSIGNOR TO REX BUGGY COMPANY, OF CONNERSVILLE, INDIANA, A CORPORATION OF INDIANA.

TOP EXTENSION FOR OPEN VEHICLE-BODIES.

1,174,155. Specification of Letters Patent. Patented Mar. 7, 1916.

Application filed April 6, 1915. Serial No. 19,443.

*To all whom it may concern:*

Be it known that I, MATTHEW R. HULL, a citizen of the United States, residing at Connersville, in the county of Fayette and State of Indiana, have invented certain new and useful Improvements in Top Extensions for Open Vehicle-Bodies, of which the following is a specification.

The object of this invention is to convert the open body of an automobile or other vehicle into one with a top and a closed body, and the particular object is to provide simple, convenient and positive means for removably securing a top and side extensions to the sides of open bodies now in common use.

I accomplish the objects of the invention by the means which I have exemplified in the accompanying drawings, wherein like characters of reference indicate like parts and wherein—

Figure 1 is a perspective view of an automobile body embodying my invention; Fig. 2 is a section on the line 2—2 of Fig. 1; Fig. 3 is a section on the line 3—3 of Fig. 2, and Fig. 4, is a perspective view of the eye-bolt and associated parts which fasten the body-members together at their rear corners, the last three views being on a larger scale than Fig. 1.

Referring to the drawings, 5 is a topless or open body of any usual or desired size and shape, and is here shown as having two doors but that is optional. Supported upon and by the body 5 is a top 6 the sides and ends of which register at their lower edges with the corresponding edges of the body 5, and are partially retained by a flange plate 7 which is securely fastened to the top 6 and extends across and below the joint between members 5 and 6. This alone, however, would not securely hold the parts under the strains incident to rough roads and hard usage, and I have resort, therefore, to the means which I will now describe:

At the two rear corners of the body 5 are usually to be found eyes 8, to which members of the usual canopy or folding tops are fastened. If the eyes 8 are not already on the body 5 they must be added. 9 is an eye-bolt the stem of which is passed through the eye 8. 10 is a plate having screw-holes to receive screws 11 by which the plate is fastened to the top 6. This plate 10 has a pin 12 which is passed through the eye in the upper end of the bolt 9. When the parts are in the position shown in Fig. 4, they are so retained by a nut 13 which is screwed upon the threaded end of the bolt 9, and by tightening the nut the parts are drawn together and the top 6 is firmly seated upon the edge of the body 5 and is there held, at the two rear corners of the job.

At any convenient place on each side of the body near the front, here shown as between the two doors on each side, a channel bar 14 is fastened by end screws 15 to the edge of the body 5. At the middle of the channel-bar is an upwardly projecting pin 16. The width of the channel in the bar is such as to receive the edge of the adjacent top member 6 with a close fit, and a hole is provided for the pin 16, which is inserted in it and holds the member 6 from movement longitudinally of the channel-bar while the flanges of the latter hold said top member from lateral movement relative to the bar. The front portion of the top 6 is fastened to the shield-frame 18.

In the first assembly the top 6 is placed on the body 5 before the plate 10 is positioned, which enables the latter to be brought into proper relation to the eyes 8 which are usually on the body 5 and are not always in exactly the same relative positions.

While I have described my invention with more or less minuteness as regards details of construction and arrangement and as being embodied in certain precise forms, I do not desire to be limited thereto unduly or any more than is pointed out in the claims. On the contrary I contemplate all proper changes in form, construction and arrangement, the omission of immaterial elements and the substitution of equivalents as circumstances may suggest or as necessity may render expedient.

I claim—

1. The combination, with a topless vehicle body of a removable top member having depending portions the lower edges of which rest upon the upper edges of said body, channel-bars fastened to one member into the channels of which the other members are inserted, means in said channels to hold the inserted members from movement longitudinally of the bars and means to draw the top and body members together.

2. The combination, with a topless vehicle body, of a removable top member having depending portions the lower edges of which rest upon the upper edges of said body, channel-bars fastened to one member into the channels of which the other members are inserted, dowel pins to prevent movement in the channels of the inserted members, and screw-means to draw the top and body members together.

3. The combination, with a topless vehicle body having top-securing eyes, of a removable top member having depending portions the lower edges of which rest upon the upper edges of said body, channel-bars secured to some of the edges of said vehicle body into which the lower edges of corresponding depending portions of said top member are inserted, means to prevent longitudinal movement of the inserted members in the channels, horizontal pins secured to the top member, an eyebolt for each pin through which the pin passes, the stem of said eyebolt passing through one of said eyes on the vehicle body, and a nut on the threaded end of the eyebolt drawing the members together.

4. The combination, with a topless vehicle body having top-securing eyes, of a removable top member having depending portions the lower edges of which rest upon the upper edges of said body, an outside flange secured to one member and overlapping the joint and part of the other member, channel-bars secured to the lower member into which the lower edges of the upper member are inserted, dowel pins to prevent the movement in the channels of the inserted members, and means for drawing the body and top members together comprising pins on the top member, eyebolts through the eyes of which the pins are inserted, the stems of the eyebolts being passed through the said eyes on the vehicle body and nuts on the threaded ends of the eyebolts.

In witness whereof I have hereunto set my hand and seal at Connersville, Indiana, this 31st day of March, A. D. one thousand nine hundred and fifteen.

MATTHEW R. HULL. [L. S.]

Witnesses:
ELLIS W. RYAN,
FRANK H. THOMAS.

Copies of this patent may be obtained for five cents each, by addressing the "Commissioner of Patents, Washington, D. C."